Patented Mar. 28, 1944

2,344,969

UNITED STATES PATENT OFFICE 2,344,969

TREATMENT OF GAS SCRUBBING AGENTS

Joseph B. Claffey, Philadelphia, Pa., assignor to The United Gas Improvement Company, a corporation of Pennsylvania No Drawing. Application May 16, 1940, Serial No. 335,557

8 Claims. (Cl. 183—115)

This invention pertains generally to the recovery of valuable hydrocarbons from gas mixtures containing them.

The invention pertains particularly to the separation and recovery of valuable condensible hydrocarbons, including the unsaturated type, from a mixture of hydrocarbon gases obtained in the manufacture of gas for instance by a process involving the pyrolysis of petroleum oil, with or without the aid of catalysts, wherein the separation and recovery is brought about by contacting the gas mixture with a liquid scrubbing agent, such as toluene.

The invention pertains more particularly to a method for pretreating the toluene prior to its use as a scrubbing agent, whereby to remove from said toluene contaminants which interfere, or tend to interfere, with the effective use of the toluene for its intended purpose.

It has been discovered that toluene is an exceedingly effective scrubbing agent for removing relatively volatile hydrocarbons (particularly C$_4$ and C$_5$ unsaturated hydrocarbons such as cyclopentadiene, isobutylene, butylene, butadiene, piperylene, isoprene, etc.) from gas mixtures containing them.

Various methods for thus utilizing toluene as a scrubbing agent are disclosed and claimed in the copending application of Edwin L. Hall, Serial Number 301,329, filed October 26, 1939, and Newcomb K. Chaney, Serial Number 307,567, filed December 5, 1939.

Such methods, generally speaking, include the step of contacting the gas with toluene as a scrubbing agent at temperatures which preferably are well below atmospheric; e. g., temperatures which may range as low as −40° C. or even lower if desired. The temperature at which scrubbing is to take place in any given case depends in part upon the degree of hydrocarbon separation and recovery desired, since, other things remaining the same, lower temperatures favor increased separation and recovery. Also lower temperatures decrease loss in toluene carried away in the vapor phase in the scrubbed gas.

As indicated in the said copending applications, toluene is a very desirable scrubbing agent for this particular purpose as contrasted with conventional absorbent oils, such as "straw oil" since (1) lesser material is required for scrubbing, (2) it has a very low freezing point (−95° C.), and (3) it is of relatively high fluidity at the low temperatures which are usually encountered in low temperature scrubbing equipment.

It has been found however, that the use of commercial grades of toluene, frequently results in stoppages due to freeze-ups in scrubbing equipment such as inlets, outlets, piping, valves, scrubbing towers, etc., when operating at low temperatures which for example may be of the order of say −40° C.

At these low temperatures crystals form and become suspended in the liquid toluene. The presence of crystals is highly undesirable since they tend to collect at various points in the low temperature equipment in amounts sufficient to in time cause stoppage.

Furthermore, these solid particles suspended in the liquid toluene tend to cause damage as by abrasion to mechanical handling equipment such as pumps, valve seats and the like, by means of which the toluene is circulated in the scrubbing system.

I have discovered that the general deficiency of commercial toluene for low temperature gas scrubbing purposes is due for the most part to the unexpected presence in commercial toluene of small amounts of water. Although the aromatic hydrocarbons are characterized by their non-miscibility with water so that hardly more than the slightest trace of water in toluene would be expected, I have discovered nevertheless, that in the case of toluene of commerce a much larger quantity is actually present and that this amount is sufficient to largely account for the above-mentioned stoppages. The presence of small amounts of benzene and/or other relatively high melting materials may also contribute to stoppage difficulties.

It is an object of my invention to preliminarily treat toluene for the removal of relatively high-melting contaminants such as water, benzol, or the like, which may render the toluene unsuited for use as a scrubbing agent.

Another object of my invention is to increase the solubility of gaseous hydrocarbons in commercial toluene by the removal of water therefrom.

The dehydration or purification of the toluene may be brought about in a number of ways.

Advantage may be taken of the wide differences in melting points of the toluene and contaminants such as water, benzol and the like. Toluene freezes at −95° C., while water freezes at 0° C. and benzene at +5.56° C. Hence by cooling commercial toluene to a temperature above its freezing point but say well below the temperature at which scrubbing is to take place, I find it possible to cause the solidification in the liquid toluene of the small amount of water, benzol and/or other like high-melting contaminants usually present. The thus-solidified impurities may then be separated from the liquid toluene while preferably maintained at a low temperature by any suitable methods such as filtration, centrifugation, or the like. Any other solid foreign matter contained in the toluene will of course be simultaneously removed.

I find for example that lowering the temperature of commercial toluene to about −75° C. and then separating the solid material which forms, while maintaining the toluene at about that low temperature, gives highly satisfactory results. The toluene thus purified may then be used as a scrubbing agent for removing valuable hydrocarbon constituents from gas mixtures at low temperatures without causing stoppages in the scrubbing system and without causing damage to mechanical equipment by reason of relatively high-melting impurities contained in toluene as commercially available.

The dehydration or purification of toluene is not limited to the cooling method thus described however.

Alternatively, suitable dehydrating agents, such as fused calcium chloride or the like, may be employed. The liquid toluene may be dehydrated as for instance by passing it through one or more layers of finely divided calcium chloride particles, whereby the moisture is removed.

Still other dehydrating agents such as "dehydrite" (magnesium perchlorate), alumina, silica gel, calcium oxide, etc., may be used alone or in combination with calcium chloride or otherwise.

Instead of contacting the commercial toluene in the liquid state with the dehydrating agent or agents it will be understood that the toluene may first be vaporized and the vapors thereof containing in addition water vapor, contacted with the solid dehydrating agent.

It is also conceivable that the vapors of the commercial toluene which it is desired to dehydrate may be contacted say countercurrently with a liquid dehydrating agent of suitably high boiling point, such as glycerol or glycol. It is even possible that highly reactive dehydrating agents such as $P_2O_5$ and concentrated sulfuric acid might be used provided conditions are such that these reagents do not have an undesired effect such as by reacting with the toluene itself. In view of this possibility their use would not ordinarily be preferred. In other words, dehydrating agents should preferably have no deleterious effect upon the toluene undergoing treatment.

Other methods might conceivably be employed in separating commercial toluene from impurities, for instance fractional distillation. However, in the case of fractional distillation, the boiling points of toluene and water—unlike their freezing points—lie so close together that this method is generally unsatisfactory; especially in view of the fact that water and other impurities as I have discovered are generally present in commercial toluene, which is prepared by fractional distillation, in such amounts as to cause stoppages.

In case the cooling method of freeing commercial toluene from contaminants is employed, any suitable means may be employed for lowering the temperature. For example solid carbon dioxide may be added directly to the toluene and permitted to escape in the forms of gas or used indirectly to produce the necessary low temperatures. In such case and if desired for any reason a recovery system for gaseous $CO_2$ might be included.

The precise temperature to which the toluene is cooled is not critical, and that given is for purposes of illustration only. To prevent stoppages, it is merely necessary to cool the toluene to a point somewhat below the temperature at which it is to be employed as a scrubbing agent without freezing the toluene itself, and then separate the solid phase (crystals) thus formed. For increased solubility of hydrocarbons in the toluene scrubbing agent, substantial dehydration is desired.

If desired, the cooling treatment may be employed in combination with the treatment with dehydrating agents, or with fractional distillation, or with both.

It will be understood that my method is applicable not only as a pretreatment of fresh commercial toluene but also to toluene which previously has been employed for scrubbing purposes, and in which undesirable concentrations of relatively high-melting impurities may have been built up by absorption from the hydrocarbon gas mixture undergoing treatment.

My process is applicable to toluene intended for use in scrubbing gas mixtures generally, such as coal gas, coke oven gas, refinery oil gas, etc.

Gas scrubbing systems in which toluene purified by my process may be employed may be of any desired construction and operation and may operate at atmospheric pressure, or above or below atmospheric pressure, as desired. Conducting the gas scrubbing step at positive pressures, however, decreases the loss of toluene in the form of vapors carried away in the scrubbed gas.

It is to be understood that the foregoing is by way of illustration, and that changes, omissions, additions, substitutions and/or modifications might be made within the scope of the claims without departing from the spirit of the invention.

I claim:

1. A process for recovering relatively volatile hydrocarbon material from a gas containing the same which comprises scrubbing said gas under temperature conditions substantially below 0° C. with a dehydrated water-immiscible liquid hydrocarbon scrubbing medium comprised preponderantly or toluene.

2. A process for recovering relatively volatile hydrocarbon material from a gas containing the same which comprises scrubbing said gas under temperature conditions at least as low as approximately −40° C. with a dehydrated water-immiscible liquid hydrocarbon scrubbing agent comprised substantially entirely of dehydrated liquid commercial toluene.

3. A process for recovering relatively volatile hydrocarbon material from a gas containing the same which comprises subjecting a water-immiscible liquid hydrocarbon scrubbing medium comprised preponderantly of toluene to temperature conditions at least as low as approximately −75° C., separating the resulting solidified material therefrom including solidified traces of moisture, and thereafter scrubbing said gas with said dehydrated water-immiscible liquid hydrocarbon scrubbing medium under temperature conditions at least as low as −40° C. to absorb relatively volatile hydrocarbon material therefrom.

4. A process for recovering relatively volatile hydrocarbon material from a gas containing the same which comprises scrubbing said gas under temperature conditions substantially below 0° C. with a water-immiscible liquid hydrocarbon scrubbing medium comprised preponderantly of toluene and which is substantially free from traces of water.

5. A process for recovering relatively volatile hydrocarbon material from a gas containing the same which comprises scrubbing said gas under temperature conditions substantially below 0° C. with a water-immiscible liquid hydrocarbon scrubbing medium comprised preponderantly of toluene, said water-immiscible liquid hydrocarbon scrubbing medium having been previously subjected to temperature conditions substantially lower than said scrubbing temperature conditions followed by the separation of solidified material therefrom including solidified traces of moisture.

6. A process for the recovery of relatively volatile hydrocarbon material from a gas containing the same which comprises scrubbing said gas under temperature conditions substantially below 0° C. with a water-immiscible liquid hydrocarbon scrubbing medium comprised preponderantly of toluene, said water-immiscible liquid hydrocarbon scrubbing medium having been previously dehydrated by contacting the same with a dehydrating agent.

7. In a process for the separation of relatively volatile hydrocarbon material from gas containing the same by absorbing said relatively volative hydrocarbon material in a water-immiscible liquid hydrocarbon scrubbing medium comprised preponderantly of toluene, said absorption being effected by contacting said gas with said liquid hydrocarbon scrubbing medium under temperature conditions substantially below 0° C. but above the melting point of toluene; the step of minimizing the presence of solid phase derived from said scrubbing medium due to the low temperature conditions of said absorption which comprises subjecting said water-immiscible liquid hydrocarbon scrubbing medium comprised preponderantly of toluene to dehydrating conditions sufficiently drastic to effect the removal of minute traces of moisture therefrom prior to contacting said scrubbing medium with said gas.

8. In a process for the separation of relatively volatile hydrocarbon material from gas containing the same by absorbing said relatively volatile hydrocarbon material in a water-immiscible liquid hydrocarbon scrubbing medium comprised preponderantly of toluene, said absorption being effected by contacting said gas with said liquid hydrocarbon scrubbing medium under temperature conditions substantially below 0° C. but above the melting point of toluene; the steps of minimizing the presence of solid phase derived from said scrubbing medium due to the low temperature conditions of said absorption which comprise subjecting said water-immiscible liquid hydrocarbon scrubbing medium comprised preponderantly of toluene to temperature conditions above the freezing point of toluene but at least as low as the temperature conditions maintained in said absorption to solidify therefrom minute traces of water capable otherwise of solidifying during said absorption, and separating the resulting solid phase material from said scrubbing medium prior to the employment thereof in said absorption.

JOSEPH B. CLAFFEY.